Sept. 13, 1932.    H. NEUHAUSS    1,876,732
METALLURGICAL APPARATUS
Filed Oct. 17, 1928
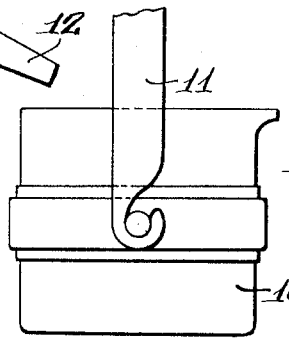
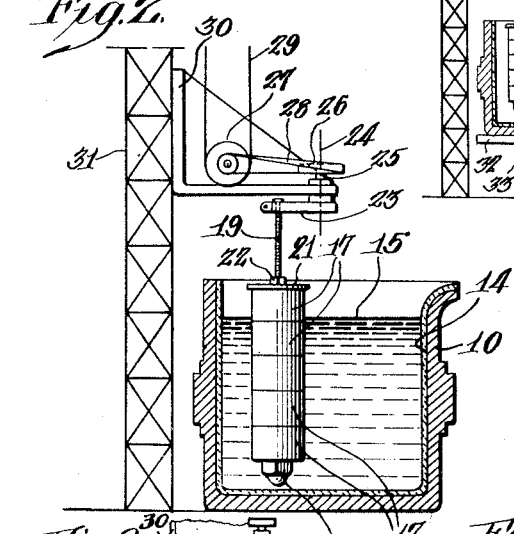
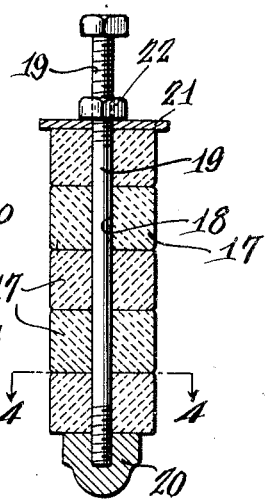
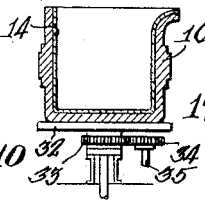
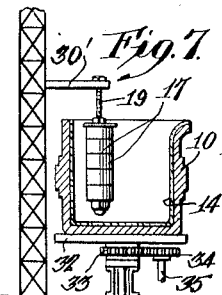
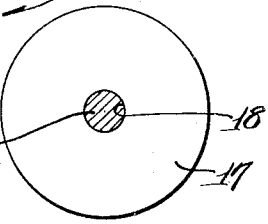
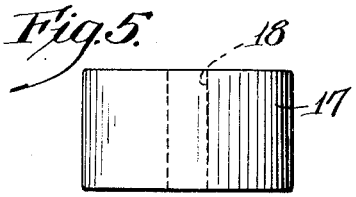
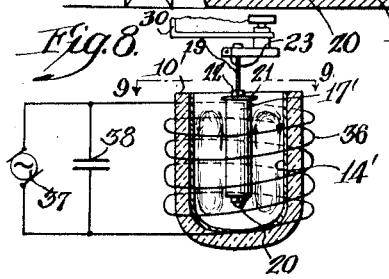
INVENTOR
Heinrich Neuhauss
BY
ATTORNEY Patented Sept. 13, 1932

1,876,732

UNITED STATES PATENT OFFICE

HEINRICH NEUHAUSS, OF DUSSELDORF, GERMANY, ASSIGNOR OF ONE-HALF TO GUILLIAM H. CLAMER, OF ATLANTIC CITY, NEW JERSEY

METALLURGICAL APPARATUS

Application filed October 17, 1928. Serial No. 313,005.

My invention relates to the desulfurization of iron and steel.

A purpose of my invention is to secure thorough contact between a desulfurizing slag forming a lining or an insert and differing parts of an iron or steel bath.

A further purpose is to form the contact between a desulfurizing slag and the iron or steel below the surface of the molten metal and to provide relative circulation so as to cause active engagement between the slag and a large part, if not all, of the molten metal.

A further purpose is to move a desulfurizing slag about through the body of a molten iron or steel bath and beneath the surface of the bath to give a maximum circulation.

A further purpose is to provide a fused desulfurizing slag in solid form suited for immersion in an iron or steel bath and melting or other dissolution therein.

A further purpose is to provide a desulfurizing slag having a temperature of melting or other dissolution slightly lower than that of an iron or steel bath in which it is intended to be used and to move it about through the bath while the surface is being dissolved in the bath to secure thorough mixture of the desulfurizing material throughout the metal of the bath.

A further purpose is to speed up desulfurizing action upon iron or steel so that it can be performed satisfactorily without requiring additional heat over that required initially for the molten bath.

A further purpose is to use circulation of metal in vertical planes within the pool of a coreless induction furnace to the best advantage in desulfurization.

Further purposes will appear in the specification and in the claims.

My invention relates both to the methods involved and to apparatus by which the methods may be carried out.

Figure 1 is a side elevation of a portion of a furnace supplying the metal and of a ladle used as the container in which my invention may be carried out.

Figure 2 is a vertical section through a ladle such as that of Figure 1, showing my desulfurizing means in position for use.

Figure 3 is an enlarged vertical section through a desulfurizing unit of the character seen in Figure 2.

Figure 4 is an enlarged section upon line 4—4 of Figure 3.

Figure 5 is an enlarged side elevation of a brick shown as one of the sections of a desulfurizing unit.

Figures 6 and 7 are broken vertical sections showing modified forms.

Figure 8 is a diagrammatic form showing an electric furnace as the container.

Figure 9 is a section of Figure 8 upon lines 9—9.

In the drawing similar numerals indicate like parts.

Desulfurization of iron and steel has been practiced in the past by the use of a so-called white slag containing lime and fluorspar. This slag has been used as a surface slag in electric furnaces both of arc type and of ring induction type but the desulfurization has not been as rapid nor as complete as it otherwise would be, partly because of the relatively poor circulation of the metal in the induction form and the almost total absence of circulation in the arc form of furnace in which the process is the more frequently carried out.

In the induction furnaces the circulation taking place has given but litle change in the metal at the surface of the bath in contact with this slag.

It is my purpose to secure quick and complete desulfurization whether the molten metal lie in an electric furnace bath or in some other container such as a ladle; to provide reliable and fully effective circulation between the desulfurizing slag and the bath, to perform a large part of the desulfurization beneath the surface of the bath and to use a desulfurizing element or unit which melts or dissolves into the bath progressively and which is moved relatively to the bath during the melting or dissolving process so as to distribute fresh quantities of desulfurizing slag through the body of the bath in which the unit moves.

There is an advantage in desulfurization within an electric furnace pool in that the furnace may be used to add heat to the metal where this is desired, and, particularly in the case of a coreless type of furnace, in that the circulation of the molten metal by reason of the electric current induction cooperates with the submerged desulfurizing unit, whether stationary or moving, to give more rapid and thorough mingling of the slag with the metal than would otherwise be secured. However, my invention can be carried out to great advantage without this circulation due to electromagnetic action and can be carried out rapidly enough to do without the heating effect of the electric current.

Though my invention can be used to advantage in an electric furnace, one of its main features lies in the fact that good results can be obtained quickly by simple and inexpensive equipment within an ordinary ladle.

In order to emphasize the freedom of my invention from necessity of use of an electric furnace I illustrate first a container which is not separately heated and in which there is no electromagnetic circulation.

In Figure 1 the ladle 10 is shown as supported from suitable hooks 11 in position to receive or to have received a charge of molten metal through spout 12 from furnace 13. The furnace is not shown in detail because it is not necessary that a particular kind of furnace be used. It can be a blast furnace, for example, or a cupola furnace.

The ladle is shown conventionally only in the Figures 1 and 2 and is supplied with any suitable lining 14 by which the charge 15 is not unfavorably affected. The inside of this lining may be covered with desulfurizing slag or the lining may be slag in order that the circulation of metal as hereinafter described may wash fresh molten metal against it to facilitate the desulfurizing operation. If this lining be not desired the slag lining is merely omitted.

Whether the ladle be lined with a desulfurizing slag or not it is my purpose to stir the bath relatively with respect to such a slag and I do this in the form shown in Figure 2 by a submerged desulfurizing slag unit of which one form is shown in Figures 2–5. This slag may be made according to any well recognized formula, for example, to include lime, fluorspar, carbon powder, silicon and some sodium salt which ingredients are fused together in some other furnace in any shape convenient for handling and circulating, such as the bricks 17, here illustrated as having holes 18 for a "stick" 19.

Any suitable number of bricks is held on the stick by a nut 20 of any material free from contaminating influence upon the bath and capable of retaining its solid form at the temperature of the bath.

For convenience of description I refer to the individual elements of which the desulfurizing unit is made up as bricks notwithstanding that they do not initially have the ordinary brick shape and that there is nothing except convenience of manufacture and of handling to interfere with each brick constituting a complete unit and permissibly including its own rod or bar by which it may be submerged instead of using a separate means of submersion or one common to a group of bricks making up the unit.

The bricks of desulfurizing slag, here typified as white slag must be sintered or fused in such combination as will melt, or dissolve, or diffuse at a temperature slightly below the temperature of the bath of iron or steel. If we assume that the temperature of the iron here used is 1250° C. the bricks should melt, just enough below this temperature for their substance to be distributed throughout the bath as the bricks are moved about the bath during a predetermined time such stirring treatment takes place. The rate of release of the unit must bear a proper relation to the speed of stirring such that the slag will desulfurize new portions of bath as it comes in contact with them and so that the slag will not wholly leave the unit until the operation is complete.

With a relatively lower melting it is desirable to have more rapid circulation to complete the circulation before the bricks are fully melted; and along with a high melting point for the bricks can go a lower speed of circulation of the "stick" about and in the pool.

The temperature of dissolution of the brick surface must, therefore, be chosen in keeping with the size of pool in which it is to be used and the rapidity of circulation.

In the ingredients given it is the intention to give an example only, as the ingredients may be varied but with this content the lime tends to make the temperature of fusion (and, therefore, the temperature of dissolution) higher whereas the fluorspar and sodium both tend to lower this temperature and the carbon powder and silicon powder are chemically inert so far as effect upon the temperature of fusion is concerned. They can be used to prevent too rapid melting of the elements.

The bricks will not be submerged by weight alone but may be clamped in position between the nut and the cap 21 forming a unit held in position by a separate nut 22 and then be forcibly submerged.

The desulfurizing unit, whatever its make-up, whether in a single piece or in separate elements or units, may be held in submerged position and handled by any suitable holder 23 which is movable in Figure 2 by rotation. It is revolved about an axis 24 by shaft 25 driven through pulleys 26 and 27 and bolts 28 and 29. The whole mechanism is supported by bracket 30 from post 31.

Other mechanical means of causing relative movement may be used to bring the desulfurizing unit in contact with all parts of the bath. When the operation has been completed what remains of the unit may be removed from the bath.

The movement of the submerged portion of the unit circulates the bath also so that new parts of the bath come in contact with the lining.

In Figure 6 the bath is supported upon a table which is rotated or, preferably oscillated, back and forth by gearing 33, 34 from shaft 35. The friction of the metal upon the desulfurizing lining 14'—which may be of the same general fused character as the units,—and the reversals of direction rapidly change the metal in contact with the lining. Because of the very large surface of lining in contact with the metal it is desirable, where this lining is fused, that the melting temperature be higher or that more inert content be used than in the case of the units so that the lining will not melt too quickly.

In Figure 7 the same construction is shown as in Figure 6 with the addition of a unit made up of bricks 17 and supported and held down in the bath by a fixed arm 30'. Where it is not desirable to have both the lining and unit distribute desulfurizing material the lining may be omitted.

In Figure 8 a construction is shown which not only is capable of revolving the treating unit as in Figure 2, but which also stirs the molten bath electromagnetically.

A desulfurizing slag lining 14' is shown. The circulation of any electric furnace will co-operate with a desulfurizing lining by bringing different parts of the molten bath in contact with the submerged slag. The lining is best made of sintered bricks rather than as a continuous coating.

The best form of electric furnace for this purpose is the coreless type shown because it causes a strong circulation in vertical planes, which stirs the molten metal bringing fresh parts of it into contact with the lining and with the slag unit whether the latter be stationary or moving. It is here shown as movable as in Figure 2.

The coreless furnace coil illustrated at Figure 8 is supplied with current from a generator 37 and power factor correction is effected by capacity shown at 38.

The arm 23 is movable as in Figure 2. The reference characters 17' and 14' refer to parts of the same general character as those shown at 17 and at 14 and the reference characters 19—23 refer to the same parts as in Figure 2.

Distribution of desulfurization could be obtained in such a furnace by using a desulfurizing agent which is stationary and about which the molten metal is circulated electro-magnetically. This circulation of metal illustrates the advantage of the submergence of the slag, whether upon the unit or as a lining where circulation can be obtained by any means, whether by movement of the unit or of the container, or of the molten metal. In this form of Figure 8 the unit is shown as comprising but one brick.

The lining of slag may be omitted here also when its advantages are not desired.

I move the desulfurizing unit bodily about the bath or move the bath with respect to a fixed desulfurizing unit or move both of them as proves most desirable.

It will be seen that my immersion of the desulfurizing material beneath the surface of the bath makes it possible for me to vary and use not only a lining and desulfurizing unit, but also various kinds of circulation independently or by the unit to get the greatest benefit in an individual installation.

In operation the temperature at which the desulfurizing unit melts cannot be too far below the molten bath or the melting of the unit takes place with undue rapidity, giving excessive relative release or dispersion of desulfurizing material within the portion of the bath first engaged as distinguished from release within other parts of the bath; and it cannot melt at too nearly the temperature of the bath without requiring an excessive length of time for treatment of a bath. Between these limits the desired temperature of melting can be learned easily by experiment so as to suit not only to the temperature of the bath but to the intended normal speed of circulation of the unit and to the use or non-use of electro-magnetic or mechanical bath circulation to speed up diffusion or thoroughly mix into the metal molten slag previously released. Because the contact with the iron or steel takes place almost wholly beneath the surface of the iron or steel instead of at the surface my method and apparatus permit thorough desulfurizing with much less contact with the oxygen of the air than would otherwise take place, resulting in substantial elimination of surface oxide of iron discoloration. The sub-division of the unit into small brick form very much reduces the difficulty of manufacturing and of handling the units and makes it possible to substitute a new brick within the unit where one of the bricks is destroyed more rapidly than the others. In manufacture the bricks can be fused entire or can be built up in sintered layers.

It will be evident that whether the element or unit be in a single piece brick or in a plurality of bricks strung together upon a common carrier, makes no difference whatever in the operation of the unit or element within the bath.

It is further evident that the circulation desired may be obtained by movement of the element within the bath or by stirring of the bath about a fixed element—such as by electro-magnetic action in an electric furnace—or by a combination of these forces and that both the moving of the element and the stirring of the bath by electro-magnetic means, or by mechanical means other than the moving of the element, will alike change the portion of the bath in contact with any desired desulfurizing lining increasing the speed of desulfurization. This desulferization by the lining may take place at the same time that desulfurization is being effected by a moving element or by a bath stirred in some other manner or by both.

The element may be planned to stir one bath only, being substantially destroyed by it or may be made of such size with respect to the bath as to be effective for desulfurizing many baths successively, all as preferred by the designer.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. A container adapted to hold a pool of molten iron or steel, a desulfurizing unit melting at a temperature below the temperature of the bath, means for holding the unit so that it extends down into the bath and means for moving the unit bodily and bath relatively, eccentrically to bring the unit into contact with different parts of the molten bath.

2. A container for molten iron or steel, in combination with a lining therefor of desulfurizing slag and pool-surrounding electromagnetic means for stirring the molten iron or steel.

3. A container for molten iron or steel, electromagnetic means for producing circulation in vertical planes and a desulfurizing lining within the container whereby molten metal is desulfurized by the circulation of the bath past the lining.

4. A container for molten iron and steel, a sintered desulfurizing unit within the container and means for holding the unit within the container below the surface of the molten metal, and for moving the sintered unit about the container.

5. A container for molten iron or steel, a sintered desulfurizing agent located below the intended level of the molten metal and electromagnetic means for circulating the molten metal with respect to the agent.

6. A container for molten iron or steel, a sintered desulfurizing agent located below the intended level of the molten metal, electromagnetic means for circulating the molten metal with respect to the agent and mechanical means for moving the agent within the container.

HEINRICH NEUHAUSS.